Oct. 14, 1969    A. SARGEANT    3,471,967
TRACKS FOR ELECTRICAL VEHICLES
Filed May 24, 1966    3 Sheets-Sheet 1
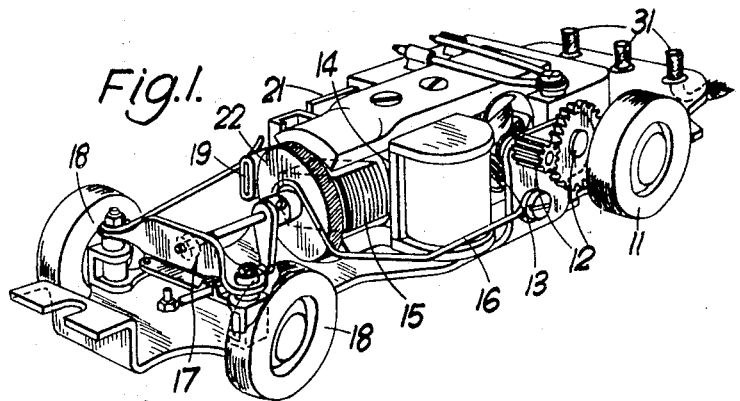
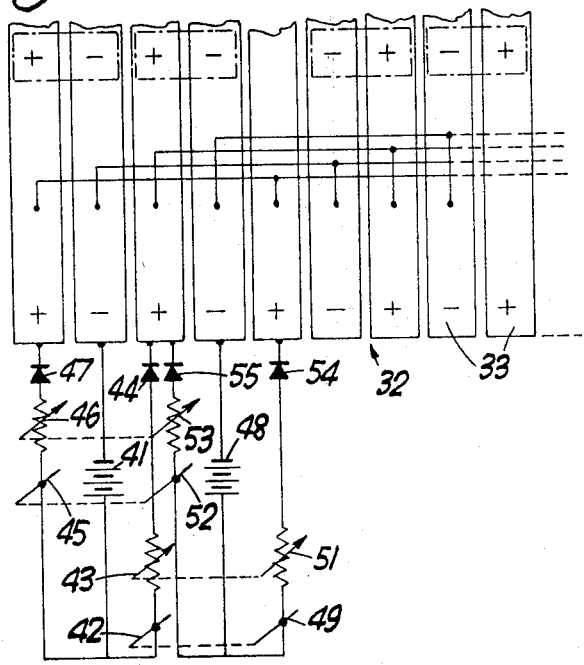
INVENTOR
ARCHIBALD SARGEANT
BY
Dugger Johnson & Westman
ATTORNEYS Oct. 14, 1969     A. SARGEANT     3,471,967
TRACKS FOR ELECTRICAL VEHICLES
Filed May 24, 1966     3 Sheets-Sheet 2
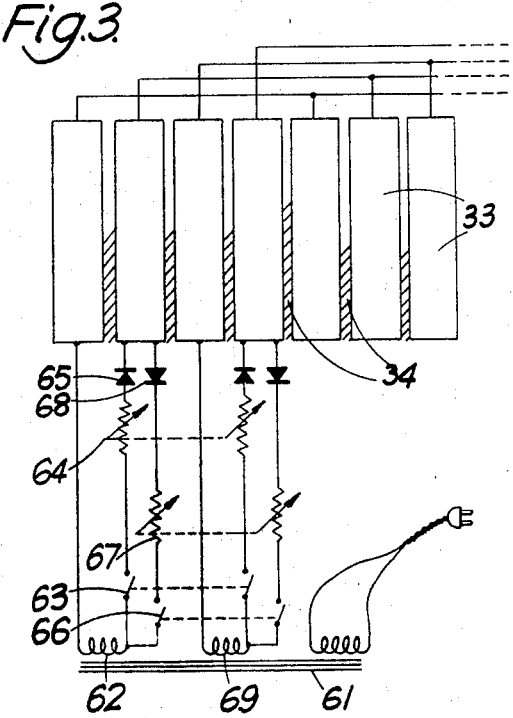
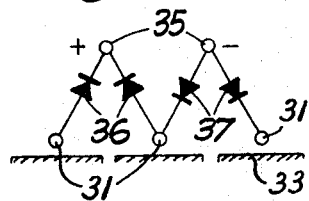
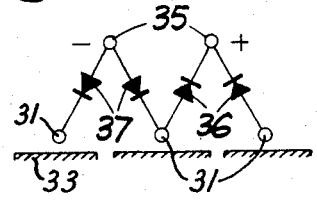
INVENTOR
ARCHIBALD SARGEANT
BY
Dugger Johnson + Westman
ATTORNEYS Oct. 14, 1969   A. SARGEANT   3,471,967
TRACKS FOR ELECTRICAL VEHICLES
Filed May 24, 1966
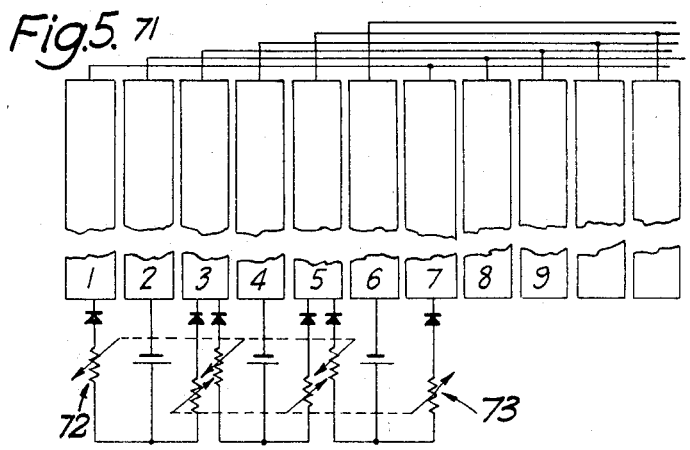
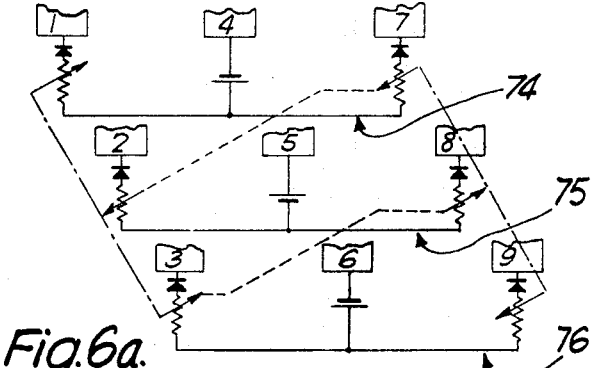
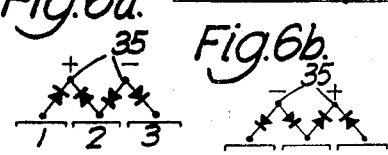
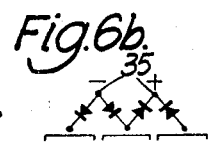
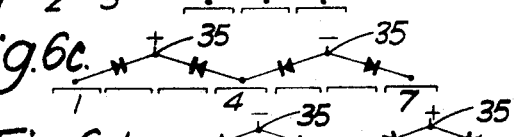
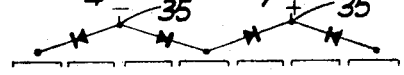
INVENTOR
ARCHIBALD SARGEANT
BY
Dugger Johnson & Westman
ATTORNEYS

United States Patent Office 3,471,967
Patented Oct. 14, 1969

3,471,967
TRACKS FOR ELECTRICAL VEHICLES
Archibald Sargeant, Bognor Regis, Sussex, England, assignor to Rosemount Engineering Company, Limited, Bognor Regis, England, a British company
Filed May 24, 1966, Ser. No. 552,504
Claims priority, application Great Britain, May 24, 1965, 21,983/65
Int. Cl. A63h 33/26
U.S. Cl. 46—244         5 Claims

ABSTRACT OF THE DISCLOSURE

A track for use with electrical powered vehicles, particularly model cars, comprises a plurality of conducting members insulated from one another and two separate supply circuits, each including voltage adjusting means, for supplying two separately adjustable potentials of opposite polarity between pairs of the conducting members. Thus, by providing vehicles having pick-up brushes with rectifiers so that two vehicles are responsive to different polarities, these two vehicles may be separately controlled. Unidirectional conducting devices are provided between the supply source and the conducting members of the track to prevent any interference between the two supply circuits via a vehicle. More than two vehicles can be separately controlled by use of different brush spacings on the vehicles and separately controlling the potentials applied between the conducting members of different spacings.

---

This invention relates to tracks for electrical vehicles and has for its principal object to provide an improved form of track enabling at least two vehicles to be independently controlled by adjusting separate controls in supply circuits supplying power to the track.

The invention is particularly applicable to toy vehicles. It is well known to have two toy vehicles which run along separate tracks, means being provided for controlling the power supplied so that, for example the vehicles may be made to race one another. The track of the present invention, however, permits of the vehicles drawing power without having to follow separate predetermined paths and thus, as will be explained later, the track can be used with steerable vehicles which can be remotely controlled. The track of this invention permits of separate control of the speed and steering of at least two vehicles and thus, in a toy race game, leads to much more realistic and entertaining operation than prior systems where each vehicle has to follow a pre-determined course.

According to this invention, a track for use with electrically powered vehicles comprises a plurality of conducting members insulated from one another and two separate supply circuits, each including voltage adjusting means, for supplying two separately adjustable potentials of opposite polarity to said conducting members so that the potentials picked up by vehicles responsive to the different polarities may be separately controlled. In one arrangement, the potentials of opposite polarity may be alternately applied to said conducting members. In this case, the vehicles may have rectifiers in series with brushes for making contact with the conductive members so that each vehicle is responsive only to potentials of one polarity. In another arrangement, the supply circuits to the track are arranged so that each conductive member is of opposite polarity to its two neighbors. The vehicle, in this case, might have three brushes arranged so as to contact three adjacent conducting members whether the vehicle is on the track; rectifiers in the circuits from the brushes can then ensure that each vehicle is energised only from those two of the three conductive members which are of the appropriate polarity.

Each vehicle may have a driving motor the speed of which is insensitive to voltage variations; the motor may be of a kind having such a characteristic or it may be provided with a voltage stabilising circuit. In this case the speed of a vehicle may be controlled by intermittently switching the supply on and off and it is then possible to use the variations of voltage to control the steering of the vehicle.

The separate supply circuits to the conducting members of the track preferably include unidirectional conducting devices, e.g. diodes, between the supply source and conducting members to prevent any interference between the two supply circuits via the vehicle.

In one construction according to the invention, a track for electrical vehicles comprises one or more sets of four conducting members insulated from one another and extending side by side along the track, a first supply circuit for supplying potential of one polarity between a first member of the or each set and a second adjacent member of the or each set, a second supply circuit for supplying an equal potential of the same polarity between a third member of the or each set adjacent the second member and a fourth member of the or each set adjacent the third member, two supply circuits for supplying potentials, of polarity opposite to that of said first and second supply circuits, between two adjacent pairs of adjacent members, and means for adjusting the amplitudes of the potentials applied to said conducting members. The potentials of opposite polarity may be applied to the same members as the first potentials, but during periods alternating with those during which the potentials of said one polarity are applied. Alternatively the potentials of the two polarities can be applied simultaneously, the two potentials of the said opposite polarity being applied respectively between the fourth and first members, and between the second and third members.

The track preferably includes insulating strips separating the members, the width of the strips being smaller than that of the members. The insulating strips are preferably provided with convex upper surfaces extending above the upper surfaces of the conducting members. The members may be straight but this is not essential.

The invention furthermore includes within its scope the combination, with a track as described above, of a vehicle having three brushes arranged to contact three members spaced at regular intervals on the track, two supply terminals, connecting means connecting one brush arranged to contact one member to one supply terminal to supply current in one direction to said one terminal and connecting a second brush arranged to contact a member spaced from said one member by said interval to said one supply terminal to supply current in said one direction to said one terminal, the connecting means further connecting said one brush to the second supply terminal to supply current in the opposite direction to said second terminal and connecting a third brush arranged to contact the other member spaced from said one member at said interval on the other side to the second supply terminal to supply current in the opposite direction to said second terminal, and a motor connected to the two supply terminals for driving the vehicle over the track. The three brushes are preferably arranged to contact three adjacent conductive members of the track. The connecting means preferably comprises four rectifiers arranged respectively in the four connections between the three brushes and the two supply terminals. Selector means may be provided to connect currents of a predetermined quality, such as amplitude or frequency, to the supply terminals.

In the following description, reference will be made to the accompanying drawings in which:

FIGURE 1 is a perspective view of the chassis of a toy vehicle;

FIGURE 2 is a circuit diagram of a track energised by direct current on which the vehicle of FIGURE 1 may be used;

FIGURE 3 is a circuit diagram of a track energised by alternating current;

FIGURES 4(a) and 4(b) are circuit diagrams of two alternative rectifier arrangements for vehicles of FIGURE 1;

FIGURE 5 is a circuit diagram of one construction of track on which four vehicles can be separately controlled; and FIGURE 6 is a diagram illustrating the arrangement of diodes in vehicles for use on the track of FIGURE 5.

Referring to FIGURE 1, a toy racing vehicle has its two rear wheels 11 driven through a reduction gear 12 from a shunt wound D.C. motor 13. With this type of motor, the speed at which the wheels 11 are driven is substantially independent of the supply voltage to the motor over an appreciable range of voltage variation. The field coil of the motor is wound on a magnetic yoke 14 which yoke is extended towards the front of the vehicle, at which there is a soft iron armature 15. A winding may be put on this armature to improve the efficiency. As the energisation of the field coil increases, the soft iron armature 15 tends to align itself with the field in the field coil yoke 14. A spring 16 is provided to return the armature 15 to a rest position. The armature 15 is mechanically coupled to a steering mechanism 17 for the front wheels 18. A rubber brake 19 mounted on a locking plate 21 which is also in the field of the magnetic yoke 14 of the field coil is biased into engagement with the braking disc 22 in the steering mechanism and is held out of engagement during energisation of the field coil.

According to the level of energisation of the field coil, the wheels 18 are steered in a particular direction. If the energisation of the field coil is slowly reduced, the wheels 18 are slowly turned back to the extreme position to which they are biased by the spring 16. Increase of energisation turns the wheels in the opposite directions. If the energisation of the field coil is suddenly reduced to zero, however the brake 19 is released by the magnetic yoke and engages the braking disc 22 so that the wheels 18 are held in the direction in which they lay before deenergisation of the field coil.

As will be seen from FIGURE 1, the pivot for turning the front wheels for steering the vehicle are slightly forward of the axes of the wheels so that the wheels form trailing castors, thereby reducing any tendency to oversteer.

At the rear of the vehicle there are three brushes 31 in a line. The vehicle runs on a track 32 which comprises a number of parallel conducting members 33 separated by relatively narrow insulating segments 34 with convex upper surfaces. The three brushes 31 are spaced to contact respectively three adjacent track members 33. The three brushes 31 are connected to the two terminals 35 of the motor 13 through diodes 36, 37 (see FIGURE 4). The central brush is connected to one terminal through a diode 36 directed in one direction and to the other terminal by a diode 37 directed in the other direction. One of the outside brushes is connected to the first terminal by a diode 36 also directed in the first direction, and the other brush is connected to the other terminal by a diode 37 also directed in said other direction. This arrangement of the rectifiers provides a positive voltage at one supply terminal 35 and a negative voltage at the other supply terminal 35 when the three track members contacted by the brushes are provided with positive, negative and positive voltages respectively or negative, positive and negative voltages respectively. Thus in either of these possible conditions of the particular track members 33 engaged by the brushes 31 the vehicle will be driven in the same direction.

In the circuit of FIGURE 2, the track 32 is supplied with positive and negative direct potentials in alternate members 33. Each member supplied with a positive potential is supplied with one potential with respect to the left-hand adjacent negative member and with another potential with respect to the adjacent right-hand negative member. The negative terminal of a direct voltage supply source, shown as a battery 41, is connected to one negative member and two arms extend from the positive terminal of the battery, one through a switch 42, an adjustable resistor 43 and rectifier 44 to the right-hand positive member adjacent the negative member, and the other through a switch 45, a second adjustable resistor 46 and rectifier 47 to the left-hand positive member adjacent the negative member.

The negative terminal of a second supply source, shown as a second battery 48, is connected to an adjacent negative member, and the positive terminal of this second battery is connected to the positive members on either side of the negative member by two arms, one containing a switch 49, ganged to switch 42, an adjustable resistor 51 ganged, and equal in value, to resistor 43 and a rectifier 54 connected to the right hand adjacent positive member, and the other containing a switch 52 ganged to switch 45, an adjustable resistor 53 ganged, and equal in value, to resistor 46 and a rectifier 55 connected to the adjacent left-hand positive member. As shown in FIGURE 2, the track may have more than four members 33. In this case, the members 33 are arranged effectively in groups of four adjacent members. Corresponding members in the different groups are connected in parallel; thus the first member is connected to the fifth, the second to the sixth and so on. The rectifiers 44, 47, 54, 55 prevent interference between right and left-hand arms.

When the three brushes 31 of the vehicle contact positive, negative and positive members respectively and its rectifiers 36, 37 are arranged to supply positive potential to the left-hand supply terminal 35 and a negative potential to the right-hand supply terminal 35 as shown in FIGURE 4(a), the vehicle will take its power from the left-hand and centre member of the three members contacted by the brushes. The vehicle will therefore be under the control of the switch 45 and adjustable resistor 46 in the left-hand arm connected to the battery 41.

If a vehicle has its diodes 36, 37 arranged between the brushes 31 and the supply terminals 35 so that a negative potential appears at the left-hand supply terminal and a positive potential at the right-hand as shown in FIGURE 4(b), when the vehicle is placed on the same three members, the vehicle will derive its supply from the centre and the right-hand members of the three contacted by the brushes, so that the vehicle will be under the control of the switch 42 and adjustable resistor 43 in the right-hand arm connected to the battery 41. By controlling the adjustable resistors 43, 46 in the two arms independently, independent control of the two vehicles on the same three members of the track can be arranged.

A steady increase of the potential applied through one or other of the arms connected to the battery 41 will, as described above, control the steering of the vehicle. Intermittent breaks in the potentials supplied through the arms will control the means speed of the vehicle without substantially affecting the steering, due to the brake 19.

As the vehicle is steering from one set of members 33 to another the brushes will pass over the insulating segments 34 between the members, and the drive to the motor will be discontinued. The momentum of the vehicle should be sufficient to carry the vehicle brushes 31 on to the adjacent members 33. It will be seen that as the three brushes of the first vehicle (with a positive left-hand supply terminal 35) moves on to the adjacent members having a positive potential central member and negative potential members on either side of the motor will derive its supply from the central and right-hand member of the three. The potential between the two members supplying the vehicle is thus derived from the negative terminal of the secondary battery 48 and from its left-hand arm, whose switch 52 is ganged to switch 45 and whose adjustable resistor 53 is ganged to and equal to the adjustable resistor 46 in the left-hand arm connected to the first battery 41. The potential supplied to the motor is therefore the same as it was when the brushes were on the first three members, so that the vehicle remains under the control of the adjustable resistors in the left-hand arms of the battery circuits. Similarly, the vehicle with a negative left-hand supply terminal remains under the control of the switches and adjustable resistors in the right-hand arms on the battery circuits.

It will thus be seen that the track of FIGURE 2 with its supply circuits, enables two vehicles to be separately controlled. One vehicle can be steered by resistors 43, 51 and its speed controlled by intermittent operation of switches 42, 49 whilst the other vehicle is steered by resistors 46, 53 and its speed controlled by switches 45, 52.

FIGURE 3 shows a circuit arrangement for supplying the track members with alternating current. The vehicles themselves are unchanged, the current being rectified by the diodes 36, 37. In FIGURE 3, a transformer 61 is fed from the alternating current mains, one secondary winding 62 being connected between a first track member and through two parallel arms to a second adjacent track member. The first arm contains a switch 63, a first adjustable resistor 64 and a diode 65 directed in one direction, and the second arm contains a second switch 66, a second adjustable resistor 67 and a diode 68 directed in the other direction. In one-half cycle of the mains supply, current will be fed through the first arm and the second member, and in the second half cycle of the supply current be fed through the second arm and the second member in the reverse direction.

The transformer has a second secondary winding 69 connected between the third member adjacent to the second member and through two parallel arms to the fourth member. The two arms in the second circuit are identical to the two arms of the first circuit, and the adjustable resistors and switches of the first arms are ganged together, as are those of the second arms. The effect of the circuit of FIGURE 3 on the vehicle is similar to that of FIGURE 2, so that vehicles with a positive left-hand supply terminal lie under the control of the switch and adjustable resistor in one of the parallel arms, whereas vehicles with a negative left-hand supply terminal lie under the control of the switch and resistor in the second of the parallel arms of each secondary winding.

To avoid vehicles becoming stuck on the insulated segments when they are driven straight down the track, the upper surfaces of insulating segments 34 are domed so that the brushes tend to slip on to the track members on either side. The members 33 moreover may be formed in wavy lines so that the vehicle driven is unlikely to be driven parallel to the insulating segments.

In place of the diodes 36, 37, alternative switching arrangements may be used to supply a voltage of the desired polarity between the supply terminals 35. For example, alternate track members may be formed of ferro-magnetic material and a magnet on the vehicle may be mounted to operate a switch controlling the polarity of the supply terminal voltage in response to the relative positions of the magnet and the ferro-magnetic track member. The switch could be operated to different positions according to whether the track member under the magnet is or is not of ferro-magnetic material.

The system has been described for operating two vehicles on the same track, each vehicle having its steering and driving operable from the voltage across the same two supply terminals. The system may be adapted to operate a single vehicle having two sets of supply terminals, one connected to receive voltages of one polarity to operate one function of the vehicle, the other connected to receive voltages of the opposite polarity to operate another function. The functions may include driving, steering and braking.

As has been indicated above, more than two vehicles, or more than two functions of one or more vehicles can be controlled by making sets of supply terminals responsive to voltages of different amplitudes or frequencies. For this purpose, the vehicle must have suitable selector means responsive to the appropriate amplitudes and/or frequencies.

FIGURES 5 and 6 shown an alternative arrangement to that shown in FIGURES 2 and 4 of a track energised by direct current providing four separate control circuits for vehicles.

FIGURE 5 is a circuit diagram of such a track. The track itself is formed similarly to that described with reference to FIGURES 2 and 3. In FIGURE 5 every sixth track members 71 are connected together. In place of the two battery circuits shown in FIGURE 2, three battery circuits in this arrangement similar to those of FIGURE 2 are connected between seven adjacent track members 71. The left-hand arm of each circuit contains an adjustable resistor 72, the three resistors 72 being ganged together. Similarly the right-hand arms of the three circuits contain adjustable resistors 73, which are also ganged together. The two sets of arms may also contain switches ganged together (not shown) in a similar arrangement to that shown in FIGURE 2.

In addition to the above-described three battery circuits, three further battery circuits 74 to 76 are connected to the track members 71. The further battery circuits are similar to the above-described circuits, except that, instead of being connected between three adjacent track members, they are connected between track members which are separated from each other by three track member spacings. One further battery circuit 74 has its battery connected to the fourth track member 71 in a line of nine, its left-hand arm being connected to the first and its right-hand arm being connected to the seventh track member of the line of nine. The second further battery circuit 75 has its battery connected to the fifth member of the line, its left-hand arm being connected to the second and its right-hand arm being connected to the eighth track member of the line. The third battery circuit 76 has its battery connected to the sixth track member, its left-hand arm connected to the third track member and its right-hand arm connected to the ninth track member. The batteries of the further circuits 74 and 76 have their positive terminals connected directly to the corresponding track member, similarly to the three batteries of the first-described circuits, but the battery of the second further circuit 75 has its negative terminal connected directly to the fifth track member. The adjustable resistors in the left-hand arms of the circuits 74 and 76 are ganged together with each other and with the adjustable resistors in the left-hand arms of the circuits 74 and 76 are ganged together with each other and with the adjustable resistor in the right-hand arm of the circuit 75. The adjustable resistors in the right-hand arms of the circuits 74 and 76 are ganged together with each other and with the adjustable resistor in the left-hand arm of the circuit 75.

FIGURES 6(a), (b), (c) and (d) show the arrangement of diodes in four vehicles which can be independently operated on the track of FIGURE 5. The two arrangements marked (a) and (b) are identical to those shown in FIGURE 4. The voltage supply between the supply terminals 35 in (a) is under the control of the three ganged-together resistors 72, and the voltage between the supply terminals 35 and in (b) is under the control of the three ganged-together resistors 73.

The two further vehicles have similar diode arrangements to those of the first two vehicles, with the exception that the three brushes contacting track members are arranged to contact members separated by three track member spacings rather than one spacing as in the other two vehicles. Voltage supplied to the supply terminals 35 of the arrangements (c) is under the control of the ganged-together resistors in the left-hand arms of the circuits 74 and 76 and the right-hand arm of circuit 75. The voltage supplied between the supply terminals 35 of the arrangement (d) is under the control of the ganged-together resistors in the right-hand arms of circuits 74 and 76 and the left-hand of circuit 75.

Other track arrangements can be used for controlling more than two vehicles. For example, cyclic switching may be provided for connecting each controlled voltage supply to two alternative pairs or groups of conductive members or, in sequence, to more than two pairs or groups. Vehicles can then have their contact brushes spaced apart by different amounts, the switching of the connections being such that any vehicle, wherever it is on the track, will be energised in at least one switch position from its associated controlled source. Considered in another way, in any one switch position, separately controlled potentials are available for vehicles with brushes at two or possibly more different spacings. This can be done only if some conductive members are temporarily unenergised and the switching changes the position of the pattern of energised conductive members to fill in the gaps. Thus, at some time during the switching sequence, each vehicle will be energised. For any spacing of brushes on a vehicle, two separate vehicles may be operated as before with potentials of opposite polarity.

I claim:

1. A vehicle and track system including in combination a track and two electrically propelled vehicles wherein the track comprises at least two sets of four conducting members insulated from one another and extending side by side along the track, a first supply circuit for supplying potential of one polarity between a first member of each set and a second adjacent member of each set, a second supply circuit for supplying an equal potential of the same polarity between a third member of each set adjacent the second member and a fourth member of each set adjacent the third member, two supply circuits for supplying potentials of polarity opposite to that of said first and second supply circuits, the potentials of the two polarities being applied simultaneously and the two potentials of the said opposite polarity being applied respectively between the fourth and first members and between the second and third members, and means for adjusting the amplitude of the potentials applied to said conducting member and wherein each vehicle has three brushes arranged to contact three of said conductive members spaced at regular intervals on the track, two supply terminals, connecting means connecting one brush arranged to contact one member to one supply terminal to supply current in one direction to said one terminal and connecting a second brush arranged to contact a member spaced from said one member by said interval to said one supply terminal to supply current in said one direction to said one terminal, the connecting means further connecting said one brush to the second supply terminal to supply current in the opposite direction to said second terminal and connecting a third brush arranged to contact the other member spaced from said one member at said interval on the other side to the second terminal to supply current in the opposite direction to said second terminal, and a motor connected to the two supply terminals for driving the vehicle over the track, said connecting means further including four rectifiers arranged respectively in the four connections between the three brushes and the two supply terminals, the four rectifiers in one vehicle being connected in the opposite sense to those in the first vehicle.

2. The apparatus of claim 1 further characterized in that the first supply circuit includes a first unidirectional conducting device, that the second supply circuit includes a second unidirectional conducting device and that said two supply circuits include respectively third and fourth unidirectional conducting devices.

3. The combination as claimed in claim 1, wherein each supply circuit has a switch for interrupting the supply whereby the speed of the vehicle may be controlled.

4. The combination of a track with two electrically powered vehicles, said track comprising a plurality of conducting members insulated from one another and two separate supply circuits, each including voltage adjusting means and a unidirectional conducting device, for supplying two separately adjustable potentials of opposite polarity to said conducting members so that the potentials picked up by vehicles responsive to the different polarities may be separately controlled, and said two vehicles each having three brushes arranged to contact three of said conductive members spaced at regular intervals on the track, two supply terminals on each vehicle, connecting means on each vehicle connecting one brush arranged to contact one member to one supply terminal to supply current in one direction to said one terminal and connecting a second brush arranged to contact a member spaced from said one member by said interval to said one supply terminal to supply current in said one direction to said one terminal, the connecting means in each vehicle further connecting said one brush to the second supply terminal to supply current in the opposite direction to said second terminal and connecting a third brush arranged to contact the other member spaced from said one member at said interval on the other side to the second terminal to supply current in the opposite direction to said second terminal, and a motor in each vehicle connected to the two supply terminals of the vehicle for driving the vehicle over the track, said connecting means in each vehicle comprising four rectifiers arranged respectively in the four connections between the three brushes and the two supply terminals, the rectifiers in the two vehicles being connected in opposite senses so that the vehicles are energized by inputs of opposite polarity from the track.

5. The combination as claimed in claim 3 wherein said motor is arranged to be insensitive to variations in the voltage at the supply terminals and wherein each vehicle includes steering mechanism controlled in accordance with the voltage at the supply terminals and wherein each supply circuit has a switch for interrupting the supply whereby the speed of the vehicle may be controlled.

References Cited

UNITED STATES PATENTS

| | | | |
|---|---|---|---|
| 2,850,987 | 9/1958 | Epergue | 46—244 |
| 2,993,299 | 7/1961 | Dingee et al. | |
| 3,205,618 | 9/1965 | Heytow. | |
| 3,339,307 | 9/1967 | Floyd et al. | 46—244 |

LOUIS G. MANCENE, Primary Examiner

ROBERT F. CUTTING, Assistant Examiner

U.S. Cl. X.R.

273—86